United States Patent Office 2,827,481
Patented Mar. 18, 1958

2,827,481
PROCESS FOR THE MANUFACTURE OF POLYENE ALDEHYDES

Otto Isler, Marc Montavon, and Rudolf Rüegg, Basel, Gabriel Saucy, Neuewelt-Munchenstein, and Paul Zeller, Neuallschwil, near Basel, Switzerland, assignors to Hoffmann-La Roche Inc., Nutley, N. J., a corporation of New Jersey No Drawing. Application July 2, 1956
Serial No. 595,134

Claims priority, application Switzerland July 6, 1955

17 Claims. (Cl. 260—488)

The present invention relates to a process for the manufacture of 6-[2,6,6-trimethyl-cyclohexen-(1)-yl]- or 6-[2,6,6-trimethyl-cyclohexyliden]- or 6-[2,6,6-trimethyl-cyclohexen - (2) - yliden] - 4 - methyl - hexadien - (2,4)-al-(1) carrying an oxo, hydroxy or esterified hydroxy group in the 4-position of the cyclohexyl ring. This process comprises acetalising a 4-[2,6,6-trimethyl-cyclohexen-(1)-yl]- or 4-[2,6,6-trimethyl-cyclohexyliden]- or 4-[2,6,6 - trimethyl - cyclohexen - (2) - yliden] - 2 - methyl-buten-(2)-al-(1) carrying an oxo, hydroxy or esterified hydroxy group in the 4-position of the cyclohexyl ring, condensing the resulting 4-substituted 4-[2,6,6-trimethyl-cyclohexen-(1)-yl]- or 4-[2,6,6-trimethylcyclohexyliden]- or 4-[2,6,6-trimethyl-cyclohexen-(2)-yliden]-2-methyl-buten-(2)-acetal-(1) with a vinyl ether in the presence of an acidic condensing agent, and treating the resulting 4-substituted 6-[2,6,6-trimethyl-cyclohexen-(1)-yl]- or 6-[2,6,6-trimethyl-cyclohexyliden]- or 6-[2,6,6-trimethyl-cyclohexen - (2) - yliden] - 4 - methyl - hexen - (4)-ether-(3)-acetal-(1) with acidic agents to cause hydrolysis and splitting off of alcohol from the position 2,3.

The process may be illustrated by the following reaction scheme:

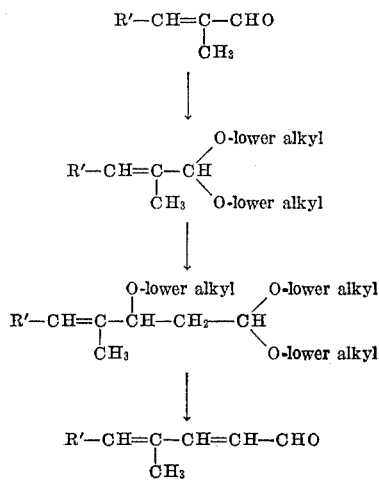

R' in the above formulae represents the radicals

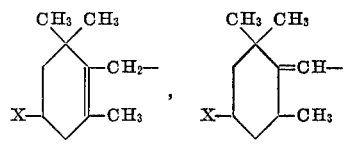

or

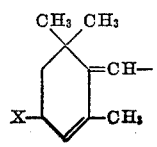

and X represents an oxo, hydroxy or esterified hydroxy group.

The starting materials used in the present process are 4 - [2,6,6 - trimethyl - cyclohexyl] - 2 - methyl - buten-(2)-als-(1) which are substituted in the 4-position of the cyclohexyl ring and which contain at least one additional double bond in the cyclohexyl ring or adjacent thereto. References hereinafter to substituents in the "4-position" mean the 4-position of the cyclohexyl ring. The preferred starting compounds are those aldehydes which carry an oxo group in the 4-position. The same good results are obtained, however, if aldehydes carrying a free hydroxy group or an esterified hydroxy group, e. g. an acetoxy group, in the 4-position are used.

The first step of the process according to the present invention consists in acetalising the 4-substituted starting aldehydes. The acetalisation is carried out, e. g., by means of an ortho-ester in the presence of an acidic condensing agent, such as boron trifluoride etherate, zinc chloride, ortho-phosphoric acid, p-toluenesulfonic acid, etc. The ortho-esters of lower aliphatic acids with low aliphatic alcohols, preferably methyl, ethyl or n-butyl ortho-formate, are particularly suitable. In the preferred mode of operation the starting aldehyde is acetalised in the presence of alcohol, ortho-phosphoric acid and traces of p-toluenesulfonic acid by means of a lower alkyl ortho-formate. The resulting acetals are yellowish oils. In the U. T. spectrum in petroleum ether solution the 4-substituted 4 - [2,6,6-trimethyl-cyclohexyliden]-2-methyl-buten-(2)-al-(1)-acetals have an absorption maximum at 246–248 m$\mu$, whereas the 4-[2,6,6-trimethyl-cyclohexen-(2)-yliden]-2-methyl-buten-(2)-al-(1)-acetals carrying a hydroxy or esterified hydroxy group in the 4-position show an absorption maximum at 282 m$\mu$, and the 4-[2,6,6-trimethyl - 4 - oxo - cyclohexen - (2) - ylidene] - 2 - methyl-buten-(2)-al-(1)-acetal has an absorption maximum at 316 m$\mu$. The 4-substituted 4-[2,6,6-trimethyl-cyclohexen-(1)-yl]-2-methylbuten-(2)-al-(1)-acetals do not show any absorption maximum in the ultraviolet spectrum between 220 and 250 m$\mu$. The acetals need not be purified, e. g. by distillation, prior to their further processing.

In the second step of the present process the acetals are condensed with a vinyl ether in the presence of an acidic condensing agent to form 4-substituted 6-[2,6,6-trimethyl-cyclohexen-(1)-yl]- or 6-[2,6,6-trimethyl-cyclohexylidene]- or 6-[2,6,6-trimethyl-cyclohexen-(2)-yliden]-4-methyl-hexen-(4)-ether-(3)-acetals-(1). Suitable condensing agents include boron trifluoride etherate, zinc chloride, titanium tetrachloride, aluminum chloride, ferric chloride, stannic chloride, etc. Advantageously the vinyl ether of the same alcohol with which the acetals have been prepared, e. g. methyl vinyl ether, ethyl vinyl ether or n-butyl vinyl ether, is used. The condensation is carried out at as low a reaction temperature as possible in order to avoid undesired side-reactions, such as polymerisation and condensation of the formed products with vinyl ether. Depending on the condensing agent used and the acetal and vinyl ether selected for the condensation, the optimum reaction temperature is comprised between 0 and 50° C. In the preferred mode of operation, approximately molar amounts of the acetal and vinyl ether are allowed to react with each other at 20–40° C. in the presence of zinc chloride or boron trifluoride etherate. In this manner, substantially pure ether acetals are obtained in an almost quantitative yield. No particular purification, e. g. by distillation, is necessary prior to the further processing of the ether acetals.

The third step of the process according to the present invention consists in hydrolysing the obtained ether acetals in an acidic medium in a manner known per se. This reaction is preferably conducted in such a manner, e. g. by heating, that hydrolysis of the acetal groups and splitting off of alcohol from the position 2,3 take place simultaneously with formation of the 4-substituted 6-[2,6,6 - trimethyl-cyclohexen - (1) - yl]- or 6 - [2,6,6-trimethyl - cyclohexyliden]- or 6-[2,6,6 - trimethyl - cyclohexen-(2)-yliden]-4-methyl-hexadien-(2,4)-al-(1). This reaction step is conveniently carried out in the presence of water-soluble, organic or inorganic acids, such as p-toluenesulfonic acid, acetic acid, propionic acid, oxalic acid, sulfuric acid, phosphoric acid etc., or water-soluble acid salts, such as zinc chloride and sodium bisulfate. It is advantageous to carry out the reaction with exclusion of oxygen and addition of an antioxidant, such as hydroquinone. The reaction conditions are suitably selected in such a manner that the alcohol which forms during the reaction is continuously removed from the reaction mixture. A water-miscible solvent, such as dioxane, tetrahydrofurane, ethyleneglycol, dimethyl ether etc., can be added to the reaction mixture in order to obtain a homogeneous mixture. Preferably, the ether acetals are heated to about 100° C. with acetic acid in the presence of an alkali acetate and some water. The reaction mixtures are conveniently diluted with water, and the products are isolated by extraction with ether. They can be purified by distillation or chromatography on alumina.

In order to avoid losses of substance due to polymerisation and decomposition, it is advisable to avoid temperatures exceeding 120° C. throughout the process and, in particular, to carry out the further processing of the intermediates, viz. the acetals and ether acetals, in the non-distilled state.

The aldehydes obtained by the process of the present invention possess characteristic absorption maxima in the ultraviolet spectrum. In view of the cis-trans-isomerism at the double bonds, there exist several stereoisomeric forms of these aldehydes. The 4-substituted 6-[2,6,6-trimethyl-cyclohexen-(1)-yl]- or 6-[2,6,6-trimethyl-cyclohexyliden]- or 6-[2,6,6-trimethyl-cyclohexen-(2)-yliden]-4-methyl-hexadien-(2,4)-als-(1) can be used as antioxidants or as protective agents against radiation. Besides, they are valuable intermediates for the synthesis of oxygen-containing carotenoids, such as zeaxanthene, rhodoxanthene, kryptoxanthene, astaxanthene, etc. They can be converted into the corresponding $C_{19}$-aldehydes by acetalisation, condensation with an isopropenyl ether and hydrolysis. These $C_{19}$-aldehydes can then be converted into the desired carotenoids by metal-organic condensation with acetylene, dehydration with simultaneous allyl rearrangement, partial hydrogenation and isomerisation.

The present invention will now be illustrated by the following examples without being limited thereto.

EXAMPLE 1

*6-[2,6,6-trimethyl - 4 - acetoxy-cyclohexyliden]-4-methyl-hexadien-(2,4)-al-(1)*

To a solution of 7.3 g. of 4-[2,6,6-trimethyl-4-acetoxy-cyclohexyliden]-2-methyl-buten-(2)-al-(1) in 6.8 ml. of ethyl ortho-formate there was added a solution of 0.13 ml. of ortho-phosphoric acid in 1.3 ml. of absolute ethanol, and after the addition of 0.005 g. of p-toluene-sulfonic acid the reaction mixture was allowed to stand at room temperature for 24 hours. Then 1.5 ml. of pyridine were added, and the reaction mixture was poured into a mixture of 100 g. of 5% sodium bicarbonate solution and 20 g. of ice. The product was taken up in ether, and the ether extract was shaken with sodium bicarbonate solution and dried over sodium sulfate. After evaporation of the ether, the residue was freed from excess ethyl ortho-formate in a high vacuum at 50° C. There were thus obtained 7.9 g. of acetal ($n_D^{25}$=1.4965; U. V. absorption maximum at 246 m$\mu$ in petroleum ether solution) which was further processed without any purification. The acetal was dissolved in 10 ml. of petroleum ether (B. P. 30–60° C.), 1.4 ml. of a 10% solution of zinc chloride in ethyl acetate were added to the solution, and then 1.9 g. of vinyl ethyl ether in 2 ml. of petroleum ether (B. P. 30–60° C.) were slowly added dropwise, while stirring and maintaining the temperature below 30° C. The reaction mixture was then allowed to stand at room temperature for 20 hours. Thereupon, the petroleum ether was removed at 30° C. in the vacuum of a water jet pump, and 20 ml. of glacial acetic acid, 1 ml. of water and 2 g. of sodium acetate (cryst.) were added to the residue. The mixture was heated at 95° C. for 3 hours in a carbon dioxide atmosphere. After cooling, the solution was poured into 200 ml. of water, and the product was extracted with ether. The ether solution was washed several times with water and then with dilute sodium bicarbonate solution. Upon drying of the ether solution over sodium sulfate and evaporation of the ether, there were obtained 6.7 g. of 6-[2,6,6-trimethyl-4-acetoxy - cyclohexyliden]-4-methyl-hexadien-(2,4)-al-(1) as a yellow viscous oil; U. V. absorption maxima at 319 and 330 m$\mu$ (in petroleum ether solution). The product can be purified by chromatographic adsorption on alumina (according to Brockmann, activity state II). The phenyl semicarbazone of the obtained aldehyde has absorption maxima in the U. V. spectrum at 237, 340 and 356 m$\mu$ (in petroleum ether solution).

The 4-[2,6,6-trimethyl - 4 - acetoxy-cyclohexyliden]-2-methylbuten-(2)-al-(1) required as a starting material in the process described above can for instance be prepared according to the following procedure:

138 g. of 2,6,6-trimethyl-1-cyclohexen-4-one [which can be made, for example, from isophorone by known procedures; compare Kharasch, Journal of the American Chemical Society, 63 2308 (1941)] in 50 ml. of glacial acetic acid was stirred for two hours at 0–10° with 160 ml. of peracetic acid (containing 530 mg. of peracetic acid per ml.) and the mixture was allowed to stand overnight at 20° C. Then, while adding ice, the reaction mixture was made weakly alkaline (pH about 8) by adding 30% aqueous NaOH solution, and the reaction mixture was shaken for one hour at 20° C. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70 and 80° C., and then 2,6,6-trimethyl-2-cyclohexen-1-ol-4-one was obtained as an almost colorless oil having B. P. 110–112° C./0.1 mm., $n_D^{20}$=1.501, U. V. maximum at 226 m$\mu$ ($E_1^1$=1110 in petroleum ether solution), after standing for some time. The phenylsemicarbazone had M. P. 189–190°, U. V. maxima at 240.5 m$\mu$ and 285 m$\mu$ ($E_1^1$=807 and 778 in ethanol).

To 154 g. of 2,6,6-trimethyl-2-cyclohexen-1-ol-4-one in 200 ml. of glacial acetic acid and 500 ml. of water was quickly added dropwise 70 g. of chromic anhydride in 200 ml. of water, while stirring and cooling, so that the temperature did not rise above 30° C. The mixture was then stirred overnight at 20° C. Then the reaction mixture was saturated with ammonium chloride and was extracted with 1000 ml. of petroleum ether (boiling range 30–60° C.). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexene-1,4-dione, was distilled under a water pump vacuum; B. P. 92–94° C./11 mm., a yellow oil which solidified to crystalline form in the refrigerator, $$n_D^{21}=1.490$$

U. V. maximum at 238 m$\mu$ ($E_1^1$=942 in petroleum ether). The phenylsemicarbazone had M. P. 190° C., then resolidified and melted again at 230° C., U. V. maxima at 242.5 mμ and 325.5 mμ ($E_1^1$=875 and 580 in ethanol).

65 g. of 2,6,6-trimethyl-2-cyclohexene-1,4-dione in 250 ml. of glacial acetic acid was slowly reacted with 130 g. of zinc dust, while stirring, so that the temperature did not rise above 50° C. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30–60° C.). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M. P. 63–65° C., having no absorption maximum in the ultraviolet spectrum between 220 and 280 mμ. The phenylsemicarbazone had M. P. 218–220° C., U. V. maximum at 250 mμ ($E_1^1$=1030 in ethanol).

34.6 g. of 2,6,6-trimethyl-1,4-cyclohexanedione, 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-1-cyclohexanone product was obtained by extraction with diethyl ether and distillation of the extract. The product was obtained as a colorless oil, having B. P. 70° C./0.02 mm., $n_D^{21}$=1.469.

To a lithium amide suspension prepared by dissolving 6.7 g. of lithium in 2000 ml. of liquid ammonia was added slowly, while stirring, 52 g. of 1-methoxy-2-methyl-3-butyn-2-ol. The mixture was stirred for one hour and then 79 g. of 2,6,6-trimethyl-4-ethylenedioxy-1-cyclohexanone was added, and the reaction mixture was stirred overnight at the boiling temperature of the ammonia. 60 g. of ammonium chloride was added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There was thus obtained 92 g. of 4-(2,6,6-trimethyl-4-ethylenedioxy-1-hydroxy-1-cyclohexyl)-2 - methyl-1-methoxy-3-butyn-2-ol as a yellow, viscous oil.

92 g. of the latter was dissolved in 3000 ml. of dry diethyl ether, was mixed while stirring at 0–5° C. with a solution of 22.5 g. of lithium aluminum hydride in 300 ml. of dry diethyl ether, and the reaction mixture was refluxed for four hours. Then the reaction mixture was cooled with ice, 250 ml. of methanol was added slowly while stirring at 0–5° C., and the clear solution was poured into a mixture of 100 g. of ice and 600 ml. of saturated ammonium chloride solution. The precipitated aluminum hydroxide was filtered off and the precipitate was washed with diethyl ether and added to the filtrate. The combined liquors were washed with water, dried over sodium sulfate and the solvents were driven off. The residue was partitioned between petroleum ether and 70% methanol, in the manner indicated above, and from the methanol extracts there was obtained 70 g. of 4-(2,6,6-trimethyl - 4 - ethylenedioxy - 1 - hydroxy - 1 - cyclohexyl)-2-methyl-1-methoxy-3-buten-2-ol as a light yellow, viscous oil.

70 g. of the latter was mixed with 140 ml. of formic acid and the mixture was heated for 25 minutes at 100° C. The reaction mixture was poured onto ice and extracted with diethyl ether, the ethereal solution was washed with water and with dilute sodium bicarbonate solution, dried over sodium sulfate, and the ether was driven off. The residue was dissolved in 200 ml. of glacial acetic acid, 26 ml. of water and 32 g. of sodium acetate were added, and the mixture was heated at 95° C. for two hours. Then it was diluted with ice water, and was extracted with diethyl ether, the ether extract was washed with water and with dilute sodium bicarbonate solution, dried over sodium sulfate and the ether was driven off. The residue was distilled in vacuum, thereby yielding 4-(2,6,6-trimethyl - 4 - oxo - 1 - cyclohexylidene) - 2 - methyl - 2-buten-1-al as a yellow oil having B. P. ca. 110° C./0.02 mm., $n_D^{21}$=1.555 (U. V. maximum at 284 mμ in petroleum ether).

A solution of 31 g. of 4-(2,6,6-trimethyl-4-oxo-1-cyclohexylidene)-2-methyl-2-buten-1-al in 34 ml. of orthoformic acid ethyl ester and 7 ml. of absolute ethanol was mixed with 0.65 ml. of orthophosphoric acid and 0.05 g. of p-toluene-sulfonic acid, and the mixture was allowed to stand for 24 hours at room temperature. 7 ml. of pyridine was added and then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60° C. There was thus obtained 40 g. of 4-(2,6,6-trimethyl-4-oxo-1-cyclohexylidene)-2-methyl-1,1-diethoxy-2-butene (U. V. maximum at 248 mμ in petroleum ether).

40 g. of the latter product was dissolved in 600 ml. of dry diethyl ether and was mixed slowly, while stirring at 0–5° C., with a solution of 2.8 g. of lithium aluminum hydride in 40 ml. of diethyl ether. The reaction mixture was stirred for one hour at room temperature, then was cooled to 0–5° C.; 20 ml. of methanol was added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There was obtained 39.5 g. of 4-(2,6,6-trimethyl-4-hydroxy-1-cyclohexylidene)-2-methyl-1,1-diethoxy-2-butene.

39.5 g. of the latter was acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4-(2,6,6-trimethyl - 4 - acetoxy - 1 - cyclohexylidene) - 2 - methyl-1,1-diethoxy-2-butene.

42 g. of the latter was mixed with 400 ml. of glacial acetic acid, 50 ml. of water and 65 g. of sodium acetate and heated at 95° C. for three hours. Then the reaction mixture was diluted with ice water and was extracted with diethyl ether. The ethereal solution was washed several times with water, dried over sodium sulfate and the ether was driven off. There was thus obtained 31 g. of 4-(2,6,6-trimethyl-4-acetoxy - 1 - cyclohexylidene)-2-methyl-2-buten-1-al (U. V. maximum at 284 mμ in petroleum ether).

EXAMPLE 2

*6-[2,6,6-trimethyl-4-oxo-cyclohexyliden]-4-methyl-hexadien-(2,4)-al-(1)*

11.5 g. of 4-[2,6,6-trimethyl-4-oxo-cyclohexyliden]-2-methyl-buten-(2)-al-(1) (the preparation of which is described in Example 1 above), together with 12.7 ml. of ethyl ortho-formate, 2.4 ml. of absolute ethanol, 0.24 ml. of ortho-phosphoric acid and 0.005 g. of p-toluene-sulfonic acid were allowed to stand at room temperature for 26 hours. Then 2 ml. of pyridine were added, and the mixture was poured into 200 ml. of 5% sodium bicarbonate solution. The product was extracted with ether and, upon drying of the ether solution and evaporation of the ether and excess ethyl ortho-formate in a high vacuum at 50° C., there were obtained 14 g. of acetal in the form of a yellowish oil; $n_D^{22} = 1.510$; U. V. absorption maximum at 248 mµ (in petroleum ether solution). The acetal was dissolved in 10 ml. of petroleum ether (B. P. 30–60° C.) and to the obtained solution 2 ml. of a 10% solution of zinc chloride in ethyl acetate were added. Then 3.7 g. of vinyl ethyl ether in 3 ml. of petroleum ether (B. P. 30–60° C.) were slowly added dropwise, while stirring and maintaining the temperature of the mixture below 30° C. The reaction mixture was allowed to stand overnight, and the petroleum ether was evaporated in the vacuum of a water jet pump at 30° C. 40 ml. of glacial acetic acid, 2 ml. of water and 4 g. of sodium acetate (cryst.) were added to the residue, and the mixture was stirred for 3 hours at 95° C. in a carbon dioxide atmosphere. After cooling, the reaction mixture was diluted with 200 ml. of water, and the product was separated by extraction with ether. The ether solution was washed several times with water and dilute sodium bicarbonate solution. After drying and evaporation of the ether solution, there were obtained 11.5 g. of 6-[2,6,6-trimethyl-4-oxo-cyclohexyliden]-4-methyl-hexadien-(2,4)-al-(1) as a yellow viscous oil showing maxima in the U. V. absorption spectrum at 317.5 and 330 mµ (in petroleum ether solution).

EXAMPLE 3

*6-[2,6,6-trimethyl-4-oxo-cyclohexen-(2)-yliden]-4-methyl-hexadien-(2,4)-al-(1)*

25.1 g. of 4-[2,6,6-trimethyl-4-oxo-cyclohexen-(2)-yliden]-2-methylbuten-(2)-al-(1) were stirred for 24 hours at room temperature with 25 g. of ethyl ortho-formate, 0.5 g. of ortho-phosphoric acid, 10 ml. of absolute alcohol and 0.01 g. of p-toluenesulfonic acid. Then 5 ml. of pyridine were added and the mixture was poured into a mixture of 300 ml. of 5% sodium bicarbonate solution and 20 g. of ice. The product was extracted by shaking the mixture with petroleum ether (B. P. 30–60° C.), and the petroleum ether solution was washed once with dilute sodium bicarbonate solution and once with water. After drying of the petroleum ether solution over sodium sulfate and evaporation of the petroleum ether, there were obtained 32 g. of acetal; $n_D^{22} = 1.536$; U. V. absorption maximum at 316 mµ (in petroleum ether).

9 g. of vinyl ethyl ether and 9 ml. of a 10% solution of zinc chloride in ethyl acetate with 0.01 ml. of boron trifluoride etherate were added simultaneously at 32–34° C. to the obtained acetal, while stirring vigorously. The mixture was then allowed to stand at room temperature for 24 hours. Then, 250 ml. of glacial acetic acid, 15 ml. of water and 25 g. of sodium acetate (cryst.) were added, and the mixture was heated for 5 hours at 95° C., while being shaken intermittently. For isolating the product, the reaction mixture, after cooling, was poured into 2000 ml. of water, the mixture was extracted with petroleum ether (B. P. 30–60° C.), and the petroleum ether solution was washed repeatedly with water, dilute sodium bicarbonate solution and water. After drying of the petroleum ether solution over sodium sulfate and evaporation of the petroleum ether, there were obtained 24 g. of 6-[2,6,6-trimethyl-4-oxo-cyclohexen-(2)-yliden]-4-methyl-hexadien-(2,4)-al-(1) which partly crystallised; U. V. absorption maximum at 350–352 mµ (in petroleum ether solution).

The 4-[2,6,6-trimethyl-4-oxo-cyclohexen-(2)-yliden]-2-methylbuten-(2)-al-(1) required as a starting material in the process described in this example can for instance be prepared according to the following procedure:

34.6 g. of 2,6,6-trimethyl-2-cyclohexene-1,4-dione (obtained as described in Example 1 above), 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-2-cyclohexen-1-one product was obtained by extraction with diethyl ether and distillation of the extract. The product was obtained as a colorless oil, having B. P. 65° C./0.03 mm., $n_D^{22} = 1.490$, U. V. max. 225.5 mµ ($E_1^1 = 560$ in petroleum ether).

To lithium amide suspension prepared by dissolving 4.2 g. lithium in 500 ml. of liquid ammonia was added slowly while stirring 37 g. β-chloro-vinyl-ethylether. The mixture was stirred for 5 minutes and then 42 g. of 2,6,6-trimethyl-4-ethylene-dioxy-cyclohexene-2-one-1 were slowly added, and the reaction mixture stirred for 48 hours at the boiling temperature of the ammonia. After the addition of 38 g. of ammonium chloride was completed, the ammonia was driven off. The residue was taken up in diethyl ether and insoluble material was filtered off. After decoloration of the ether solution with active charcoal, the solution was dried over sodium sulfate and the ether was driven off. There was obtained 2,6,6-trimethyl-1-hydroxy-1-ethoxyethinyl-4-ethylenedioxy-cyclohexene-(2).

The 2,6,6-trimethyl-1-hydroxy-1-ethoxyethinyl-4-ethylenedioxy-cyclohexene-(2) was dissolved in 80 ml. of toluene and 150 ml. of petroleum ether (B. P. 80–100° C.) and hydrogenated in the presence of 20 g. palladium-on -calciumcarbonate catalyst containing lead [Lindlar, Helvetica Chimica Acta 35, 450 (1952)]. The catalyst was filtered off. The solution was added with 350 ml. of 0.3 N hydrochloric acid and shaken for 20 hours under nitrogen atmosphere. The organic layer was then separated, washed with water, dried over sodium sulfate and the solvents were driven off. The residue was distilled in vacuo and recrystallized from a mixture of diethyl ether and petroleum ether. There was thus obtained 2,6,6-trimethyl-4-oxo-cyclohexen-(2)-yliden-acetaldehyde as colorless needles (M. P. 73–75° C.; U. V. maximum at 276 mµ in petroleum ether).

To 13 g. 2,6,6-trimethyl-4-oxo-cyclohexen-(2)-ylidene-acetaldehyde suspended in 16 ml. of orthoformic acid ethyl ester were added 0.3 ml. of orthophosphoric acid, 0.01 g. of p-toluenesulfonic acid in 4 ml. of absolute ethanol. The mixture was stirred for 48 hours at room temperature. To the at present clear solution were added 3 ml. of pyridine. The mixture was poured upon a solution of 100 ml. ice-cooled sodium bicarbonate, extracted with petroleum ether, the petroleum ether extract was washed with water, dried over sodium sulfate, and the solvent was driven off. The 2,6,6-trimethyl-4-oxo-cyclohexen-(2)-ylidene-acetaldehyde-diethyl-acetal obtained ($n_D^{21} = 1.486$; U. V. maximum at 270 mµ in petroleum ether) was added to a solution of 3 ml. of a 10 percent zinc chloride solution in ethylacetate and 4 drops of borontrifluorideetherate. While stirring, 7 g. of ethyl-propenylether were added slowly at a temperature of 30–35° C., the mixture was then allowed to stand for 18 hours at room temperature. To the mixture were added 200 ml. of glacial acetic acid, 10 ml. of water and 20 g. of sodium acetate. The mixture was heated for 5 hours at 95–100° C. while stirring in a nitrogen atmosphere. The reaction mixture was diluted with water, extracted with diethylether, the ether solution washed with dilute aqueous sodium bicarbonate solution, dried over sodiumsulfate and the solvent was driven off. The residue was recrystallized from methanol. There were obtained yellowish crystals of 4-[2,6,6 - trimethyl-4-oxo-cyclohexen-(2)-yliden]-2-methyl-buten-(2)-al-(1) of M. P. 115–117° C.; U. V. maximum at 317 mμ in petroleum ether.

EXAMPLE 4

6 - [2,6,6 - trimethyl - 4 - acetoxy - cyclohexen - (1) - yl]-4-methyl-hexadien-(2,4)-al-(1)

7.3 g. of 4-[2,6,6-trimethyl-4-acetoxy-cyclohexen-(1)-yl]-2-methyl-buten-(2)-al-(1) were treated in the manner described in Example 1. There were thus obtained 6.8 g. of 6-[2,6,6-trimethyl-4-acetoxy-cyclohexen-(1)-yl]-4-methyl-hexadien-(2,4)-al-(1) in the form of a viscous, yellowish oil; U. V. absorption maximum at 273–275 mμ (in petroleum ether solution). The phenyl semicarbazone of the obtained aldehyde, crystallised from ethyl acetate in almost colorless needles (M. P. 190° C.); U. V. absorption maxima at 234 and 304 mμ (in petroleum ether).

The 4-[2,6,6-trimethyl-4-acetoxy-cyclohexen-(1)-yl]-2-methyl-buten-(2)-al-(1) used as starting material can be prepared for example as follows:

31 g. of 4-(2,6,6-trimethyl-4-acetoxy-1-cyclohexylidene)-2-methyl-2-buten-1-al (prepared according to Example 1 above) was dissolved in 40 ml. of toluene, mixed with 16 g. of isopropenyl acetate and 0.2 g. of p-toluenesulfonic acid and the mixture was heated at 120–140° C. while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There was thus obtained 34 g. of 4-(2,6,6-trimethyl-4-acetoxy-1-cyclohexen-1-yl)-2-methyl-1-acetoxy-1,3-butadiene (U. V. maximum at 262 mμ in petroleum ether).

34 g. of the latter was dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to insure acetylation of the nuclear hydroxy group, the residue, presumably containing at least some 4-(2,6,6-trimethyl-4 - hydroxy - 1 - cyclohexen - 1 - yl) - 2 - methyl - 2 - buten-1-al, was mixed with 60 ml. of pyridine and 30 ml. of acetic anhydride and the mixture was allowed to stand for 20 hours at room temperature. 100 ml. of ice water was added and the mixture was then extracted with diethyl ether. The ethereal solution was washed with cold sodium bicarbonate solution and then with water, dried over sodium sulfate and the solvent was driven off. The 4-(2,6,6-trimethyl-4-acetoxy-1-cyclohexen-1-yl)-2-methyl-2-buten-1-al thus obtained can be purified by chromatography and partitioning between solvents. U. V. maximum at 232 mμ in ethanol.

EXAMPLE 5

6 - [2,6,6 - trimethyl - 4 - acetoxy - cyclohexen - (2) - yliden]-4-methyl-hexadien-(2,4)-al-(1)

28.8 g. of 4-[2,6,6-trimethyl-4-acetoxy-cyclohexen-(2)-yliden]-2-methyl-buten-(2)-al-(1) were treated in the manner described in Example 3. There were thus obtained 25.3 g. of 6-[2,6,6-trimethyl-4-acetoxy-cyclohexen-(2)-yliden]-4-methyl-hexadien-(2,4)-al-(1) in the form of a yellowish oil; U. V. absorption maxima at 353 and 372 mμ (in petroleum ether solution).

The 4 - [2,6,6 - trimethyl - 4 - acetoxy-cyclohexen-(2)-yliden]-2-methyl-buten-(2)-al-(1) required as a starting material may be prepared from 4-[2,6,6-trimethyl-4-oxo-cyclohexen-(2)-yliden]-2-methyl-buten-(2)-al-(1) (the preparation of which is described in Example 3 above) in the following manner:

25 g. 4 - [2,6,6 - trimethyl - 4 - oxo - cyclohexen-(2)-ylidene]-2-methyl-buten-(2)-al-(1) were suspended in 25 ml. of orthoformic acid ethyl ester and mixed with 0.5 ml. of orthophosphoric acid and 0.02 g. of p-toluenesulfonic acid and 6 ml. of absolute ethanol. The mixture was stirred for 48 hours at room temperature. To the clarified solution were added 5 ml. of pyridine and the solution was poured upon 200 ml. of ice-cooled sodium bicarbonate solution, then the solution was extracted with petroleum ether, the petroleum ether solution washed with water, dried over sodium sulfate and the solvent was driven off. The thus obtained 4-[2,6,6-trimethyl-4-oxo - cyclohexen - (2) - ylidene] - 2 - methyl - 1,1 - diethoxy-butene-(2) ($n_D^{23}$=1.532; U. V. maximum at 316 mμ in petroleum ether solution) was dissolved in 250 ml. of absolute diethylether and was mixed slowly while stirring at 0–5° C. with a solution of 3.2 g. of lithium aluminum hydride in 80 ml. of absolute diethylether. The reaction mixture was stirred for one hour at room temperature then was cooled to 0–5° C.; 10 ml. of methanol was added slowly and poured upon 50 ml. of saturated ammonium chloride solution. The precipitated aluminum hydroxide was filtered off and washed with diethyl ether, the ether was added to the filtrate, the combined liquors were washed with water, dried over sodium sulfate and the solvent material was driven off.

The thus obtained 4-[2,6,6-trimethyl-4-hydroxy-cyclohexen - (2) - ylidene] - 2 - methyl - 1,1 - diethoxy - butene-(2) was dissolved in 60 ml. of pyridine mixed with 40 ml. of acetic acid anhydride and allowed to stand for 20 hours at room temperature. Then the solution was poured on ice-water, extracted with petroleum ether and the petroleum ether solution was washed with ice-cooled sodium bicarbonate solution and with water, dried over sodium sulfate, the solvent was driven off and the residue was dried in vacuo. There was obtained 4-[2,6,6 - trimethyl - 4 - acetoxy - cyclohexen - (2) - ylidene]-2-methyl-1,1-diethoxy-buten-(2) (U. V. maximum at 282 mμ in petroleum ether).

10 g. of the latter were mixed with 30 g. of a solution obtained by mixing 2 g. of sodium acetate with one ml. of water and 200 ml. of glacial acetic acid. The mixture was heated for 2 hours to 95–100° C. under nitrogen atmosphere. The reaction mixture was cooled, poured in three times the volume of water, extracted with diethyl ether, the ether solution was washed with water, dried over sodium sulfate and the solvent material was driven off. There was obtained 4-[2,6,6-trimethyl-4 - acetoxy - cyclohexen - (2) - ylidene] - 2 - methyl - buten-(2)-al-(1) showing U. V. maximum at 310 mμ in petroleum ether. (M. P. of the phenyl-semicarbazone 125–127° C.; U. V. maxima at 234 and 336 mμ in petroleum ether.)

We claim:

1. 1,1-di-lower alkoxy-4-[2,6,6-trimethyl-4-R-cyclohexen-(1)-yl]-2-methylbutene-(2), wherein R represents a member of the group consisting of hydroxy, lower alkanoyloxy and oxo radicals.

2. 1,1-di-lower alkoxy-4-[2,6,6-trimethyl-4-R-cyclohexyliden]-2-methyl-butene-(2), wherein R represents a member of the group consisting of hydroxy, lower alkanoyloxy and oxo radicals.

3. 1,1-di-lower alkoxy-4-[2,6,6-trimethyl-4-R-cyclohexen-(2)-yliden]-2-methyl-butene-(2), wherein R represents a member of the group consisting of hydroxy, lower alkanoyloxy and oxo radicals.

4. 1,1,3-tri-lower alkoxy-6-[2,6,6-trimethyl-4-R-cyclohexen(1)-yl]-4-methylhexene-(4), wherein R represents a member of the group consisting of hydroxy, lower alkanoyloxy and oxo radicals.

5. 1,1,3-tri-lower alkoxy-6-[2,6,6-trimethyl-4-R-cyclohexyliden]-4-methyl-hexene-(4), wherein R represents a member of the group consisting of hydroxy, lower alkanoyloxy and oxo radicals.

6. 1,1,3-tri-lower alkoxy-6-[2,6,6-trimethyl-4-R-cyclohexen-(2)-yliden]-4-methyl-hexene-(4), wherein R represents a member of the group consisting of hydroxy, lower alkanoyloxy and oxo radiacls.

7. 6-[2,6,6-trimethyl-4-R-cyclohexen-(1)-yl]-4-methyl-hexadien-(2)-al-(1)- wherein R represents a member of the group consisting of hydroxy, lower alkanoyloxy and oxo radicals.

8. 6-[2,6,6-trimethyl - 4 - R - cyclohexyliden]-4-methyl-hexadien-(2,4)-al-(1), wherein R represents a member of the group consisting of hydroxy, lower alkanoyloxy and oxo radicals.

9. 6-[2,6,6-trimethyl-4-R-cyclohexen - (2) - yliden]-4-methyl-hexadien-(2,4)-al-(1), wherein R represents a member of the group consisting of hydroxy, lower alkanoyloxy and oxo radicals.

10. 6-[2,6,6-trimethyl-4-acetoxy-cyclohexen-(1)-yl]-4-methyl-hexadien-(2,4)-al-(1).

11. 6-[2,6,6-trimethyl - 4 - acetoxy-cyclohexyliden]-4-methyl-hexadien-(2,4)-al-(1).

12. 6-[2,6,6-trimethyl - 4 - acetoxy-cyclohexen-(2)-yliden]-4-methyl-hexadien-(2,4)-al-(1).

13. 6-[2,6,6-trimethyl-4-oxo-cyclohexyliden]-4-methyl-hexadien-(2,4)-al-(1).

14. 6-[2,6,6-trimethyl-4-oxo-cyclohexen-(2)-yliden]-4-methyl-hexadien-(2,4)-al-(1).

15. A process for the manufacture of a member of the group consisting of 6-[2,6,6-trimethyl-4-R-cyclohexen-(1)-yl]-4-methyl-hexadien-(2,4)-al-(1), 6-[2,6,6-trimethyl-4-R-cyclohexyliden]-4-methyl - hexadien-(2,4)-al-(1) and 6-[2,6,6-trimethyl-4-R-cyclohexen - (2) - yliden]-4-methyl-hexadien-(2,4)-al-(1), respectively, wherein R represents a member of the group consisting of hydroxy, lower alkanoyloxy and oxo radicals which comprises acetalising, respectively, with a lower alkyl orthoformate in the presence of an acidic condensing agent, a member of the group consisting of 4-[2,6,6-trimethyl-4-R-cyclohexen-(1)-yl]-2-methyl-buten - (2) - al - (1), 4-[2,6,6-trimethyl-4-R-cyclohexyliden]-2-methyl-buten - (2) - al-(1) and 4-[2,6,6-trimethyl-4-R-cyclohexen-(2)-yliden]-2-methyl-buten-(2)-al-(1), wherein R has the same significance set forth above, condensing the resulting acetal at 0°–50° C. with a vinyl-lower alkyl ether in the presence of an acidic condensing agent and treating the ether-acetal thus obtained with an acidic agent to hydrolyze and split off alcohol from the 2,3-position.

16. A process according to claim 15 wherein R represents a lower alkanoyloxy radical.

17. A process according to claim 15 wherein R represents on oxo radical.

References Cited in the file of this patent
UNITED STATES PATENTS 2,671,112   Inhoffen et al. _____ Mar. 2, 1954
2,730,549   Isler et al. _____ Jan. 10, 1956

---

U. S. DEPARTMENT OF COMMERCE

PATENT OFFICE

CERTIFICATE OF CORRECTION

Patent No. 2,827,481                                    March 18, 1958

Otto Isler et al.

It is hereby certified that error appears in the printed specification of the above numbered patent requiring correction and that the said Letters Patent should read as corrected below.

Column 2, line 21, for "low" read -- lower --; line 28, for "U. T." read -- U. V. --; column 10, line 17, for "1.532" read -- 1.531 --; column 11, line 9, for "(2)" read -- (2,4) --; column 12, line 23, for "on oxo" read -- an oxo --.

Signed and sealed this 20th day of May 1958.

(SEAL)
Attest:

KARL H. AXLINE
Attesting Officer

ROBERT C. WATSON
Commissioner of Patents

U. S. DEPARTMENT OF COMMERCE
PATENT OFFICE

CERTIFICATE OF CORRECTION

Patent No. 2,827,481                                                         March 18, 1958

Otto Isler et al.

It is hereby certified that error appears in the printed specification of the above numbered patent requiring correction and that the said Letters Patent should read as corrected below.

Column 2, line 21, for "low" read -- lower --; line 28, for "U. T." read -- U. V. --; column 10, line 17, for "1.532" read -- 1.531 --; column 11, line 9, for "(2)" read -- (2,4) --; column 12, line 23, for "on oxo" read -- an oxo --.

Signed and sealed this 20th day of May 1958.

(SEAL)
Attest:

KARL H. AXLINE                                                            ROBERT C. WATSON
Attesting Officer                                                    Commissioner of Patents